Sept. 18, 1945.　　W. R. WICKERHAM　　2,384,864
CONTROL SYSTEM FOR ALTERNATING CURRENT DRIVES
Filed March 9, 1944　　2 Sheets-Sheet 1

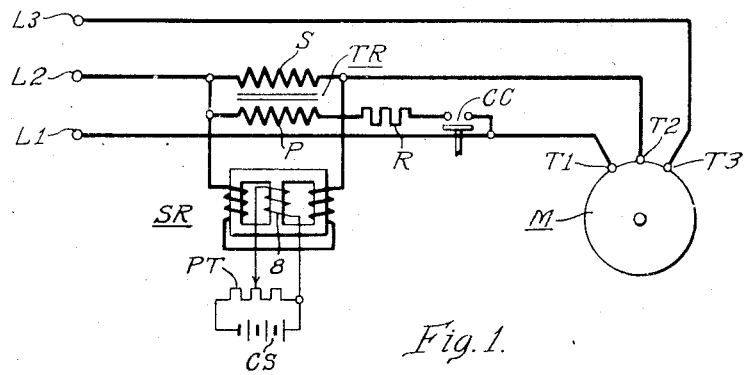

Fig. 1.

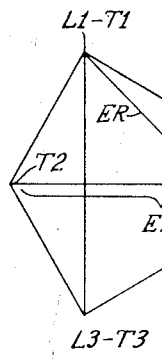

Fig. 2.

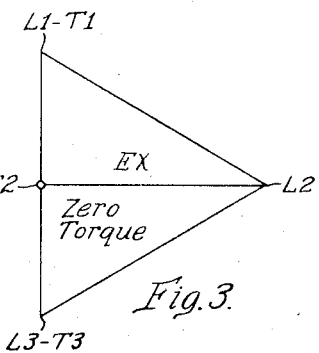

Fig. 3.

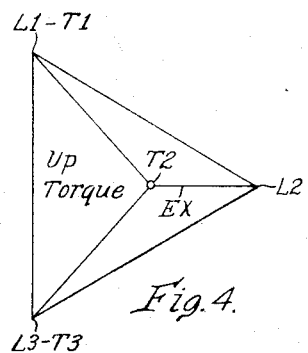

Fig. 4.

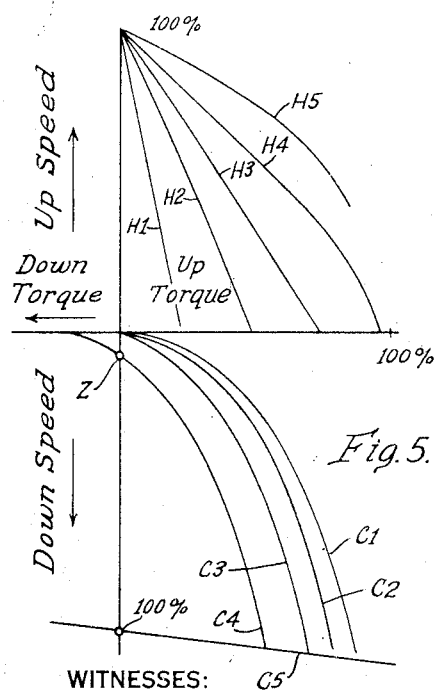

Fig. 5.

Fig. 7.

| Relay | Lower | | | | | Off | Hoist | | | | |
|---|---|---|---|---|---|---|---|---|---|---|---|
| | 5 | 4 | 3 | 2 | 1 | | 1 | 2 | 3 | 4 | 5 |
| 1CR | o o o o | o | o o | o o | o o | o | o o | o o | o o | o | o o o o |
| 2CR | | ● ● ● ● | ● ● | ● ● | ● ● | | | | | | |
| 3CR | | | | | | ⊗ | | | | | |
| 1H | | | o o | o o | o o | | o o | o o | o o | o | o o o o |
| 1L | o o o o | o | | | | | | | | | |
| 2L | | o | | | | | | | | | |
| 1R | o o o o | o | | | | | o o | o o | o o | o | o o o o |
| 1BR | o o o o | o | o o | o o | o o | | o o | o o | o o | o | o o o o |
| 1A | o o o o | o | | o o | o o | | o o | o o | o o | o | o o o o |
| 2A | o o o o | o | | | | | o o | o o | o o | o | o o o o |
| 3A | o o o o | o | | o o | o o | ⊗ | o | o o | o o | o | o o |
| 4T | o o o o | | | o o | o o | | | o o | o o | o | o |
| 4A | o o o | | | o o | o | | | o o | o | o | o |
| 5T | o o | | | | o o | | | | | o o | |
| 5A | o | | | | o | | | | | | o |
| BT | | | o o | o o | o o | ⊗ | | | | | | o Energized by Controller
● Energized when Handle Contact is operated
⊗ Energized momentarily when Controller is returned from 1st Point Lower to Off WITNESSES:
C. J. Weller.
Curt M. Avery INVENTOR
William R. Wickerham.
BY
Paul E. Friedemann
ATTORNEY Sept. 18, 1945.  W. R. WICKERHAM  2,384,864
CONTROL SYSTEM FOR ALTERNATING CURRENT DRIVES
Filed March 9, 1944  2 Sheets-Sheet 2
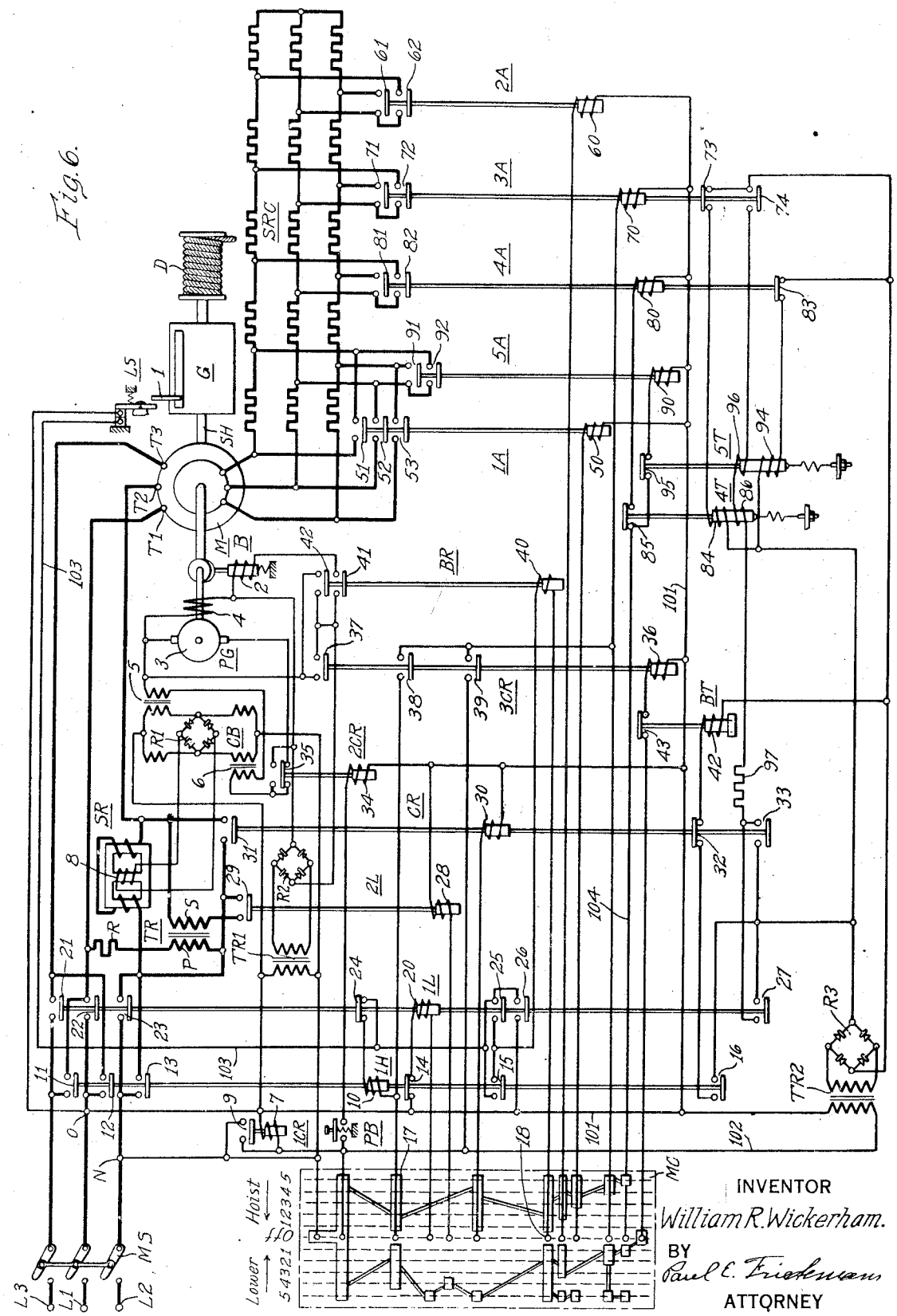

Patented Sept. 18, 1945

2,384,864

UNITED STATES PATENT OFFICE 2,384,864

CONTROL SYSTEM FOR ALTERNATING CURRENT DRIVES

William R. Wickerham, Swissvale, Pa., assignor to Westinghouse Electric Corporation, East Pittsburgh, Pa., a corporation of Pennsylvania Application March 9, 1944, Serial No. 525,628

17 Claims. (Cl. 172—152)

This invention relates to control systems for alternating current motors which involve applying a multiphase voltage of controlled unbalance to the primary motor terminals in order to obtain stabilized subsynchronous motor speeds especially during the lowering performances of hoisting or elevating equipment. Control systems of this type are described in my copending applications Serial Nos. 513,351, 513,352 and 524,387.

It is an object of my invention to obtain with alternating current motors a stabilized subsynchronous speed down to small fractions of the synchronous speed with the aid of control devices that are located outside the internal field connections of the motor and hence permit using motor of normal or standard design, either delta or star connected, for this purpose.

Another object, allied to the foregoing, is to afford operating the alternating current motor under multiphase torque conditions at high operating speeds while permitting a subsynchronous speed operation at a greatly reduced or reversed torque, especially in a hoist or elevator control system when lowering overhauling loads.

Still another object, related to the foregoing, is to devise a control system for wound rotor hoist motors which permits lowering any load, within the full load range from zero to maximum at any desired reduced, i. e. subsynchronous speed under stable operating conditions.

It is also an object of my invention to afford in alternating current motor controls an accurate slow inching, setting or leveling operation.

An object is also to obtain a torque reversing control by voltage unbalancing means which operate automatically in dependence upon the motor speed.

Furthermore, it is also intended by this invention to provide means which produce an automatic reduction of the motor torque to a minimum or zero or to negative values (countertorque) at a selected motor speed.

Another aim, subsidiary to any of the foregoing, is to achieve the desired advantages by means of control devices which, while affording a torque reversal for countertorque operation, are of very simple design as compared with the torque reversing voltage unbalance means previously disclosed.

These and other objects as well as the means provided by my invention for achieving them, will be apparent from the following description of the embodiment illustrated in the drawings, in which:

Figure 1 shows schematically a basic circuit diagram of a motor control system in accordance with the invention, Figs. 2, 3 and 4 represent vector diagrams referring to three different operating conditions of the circuit according to Fig. 1, Fig. 5 represents diagrammatically a family of speed torque characteristics as obtained by a hoist control system designed in accordance with the invention, Fig. 6 is the wiring diagram of a complete hoist control system embodying the principle elucidated by Fig. 1, and Fig. 7 is a sequence chart indicating the operation of the control relays in the system of Fig. 6 at different control points of the master controller.

Referring to Fig. 1 an induction motor M has three terminals T1, T2 and T3 connected to the corresponding terminals L1, L2 and L3 of a line supplying alternating current of balanced three-phase voltage. Interposed between motor terminals T1, T2 and line terminals L1, L2 is a network of impedance devices for unbalancing the primary voltage across the motor terminals. The network includes a saturable reactor SR whose main inductance windings are series connected between terminals T2 and L2 and disposed in parallel to the secondary winding S of a transformer TR. The primary winding P of transformer TR is connected in series with a resistor R and a control contact CC across the two phase leads T1—L1 and T2—L2. The reactor SR has a control winding 8 energized from a variable voltage source which in the diagrammatic showing of Fig. 1 is represented by a direct-current source CS of constant voltage and an adjustable potentiometer PT. The resistance of the transformer secondary S is relatively high so that, when the contact CC is open and the reactor SR at its maximum reactance, the current drawn by the winding S is low and the motor M virtually under single phase energization. The reactive resistance of the saturable reactor depends upon the degree of premagnetization produced by its control coil 8. When the potentiometer PT is adjusted for a minimum or zero voltage across coil 8, the magnetic circuit of the reactor is unsaturated and hence the reactance a maximum. When the potentiometer PT is adjusted so as to energize the coil 8 the magnetic circuit of the reactor is premagnetized and the reactance accordingly decreased. At full saturation of the magnet core, the reactance is at its minimum. In this case the resultant impedance of the transformer secondary S and the reactor SR is sufficiently low to provide the motor M with three phase excitation.

Assuming the voltage across control coil 8 to be zero so that reactor SR is unsaturated and offers its maximum impedance to the current flowing between terminals L2 and T2, the voltage distribution occurring in the terminal system L1—L2—L3 and T1—T2—T3 is approximately as represented by the vector diagram according to Fig. 3. This diagram refers to an operating condition in which the contact CC is open. The voltages across the motor terminals lie substantially on a straight line T1—T2—T3. In other words, while a balanced three phase voltage is applied to the line terminals L1, L2 and L3, the primary voltage appearing at the motor terminals T1, T2 and T3 is 100% unbalanced so that only single-phase excitation is applied. As a result no phase rotation is present and the motor torque is zero.

When the contactor CC is closed, a voltage EP according to the vector diagram of Fig. 2, is impressed on the transformer primary P. This voltage EP is caused to have the illustrated phase position relative to the voltage ER across the reactor SR due to a proper proportioning of the resistance magnitude of resistor R. Since voltages EP and EX are in phase, the voltage induced in the transformer secondary S is in phase with the reactor voltage EX. The secondary voltage is rated so as to be greater than EX. Consequently, the secondary S produces an overvoltage and delivers current to the reactor SR causing a rise in the magnitude of EX. As a result the phase voltages across the motor terminals T1, T2 and T3 assume the relation diagrammatically represented in Fig. 2. The phase rotation T1—T2—T3 is counterclockwise and contrary to that at the terminals. Consequently the torque is in a corresponding, say downward direction.

When contact CC is closed and the potentiometer PT so adjusted that the reactor SR is premagnetized, for instance up to saturation, the component resistance of S and SR is reduced so that a somewhat unbalanced three-phase torque is applied to the motor terminals, for instance, as represented by the schematic vector diagram of Fig. 4. According to this diagram, the voltage EX across the reactor SR has shrunk so that a phase rotation T1—T2—T3 in the clockwise direction appears at the motor terminals in accordance with the phase rotation L1—L2—L3 of the voltage at the line terminals. Hence the motor develops now a torque in the upward direction.

It will be understood from the foregoing that the controllable impedance network, although of simple design and containing a controllable impedance in only one of the three phase leads, permits a gradual control of the torque magnitude of the motor as well as a reversal of the torque direction.

According to a preferred form of my invention the above described control adjustment of the excitation supplied to the control winding of the saturable reactor is performed automatically in dependence upon the speed of the motor. This has the effect of obtaining any desired balanced subsynchronous speed within the available control range as will be apparent from the operation of the control system illustrated in Fig. 6 and described hereinafter.

The hoist control system according to Fig. 6 has a motor M of the wound rotor type. The primary terminals T1, T2 and T3 of the motor are connected to the line terminals L1, L2 and L3 through a control arrangement of the type shown in Fig. 1. The connection extends also through a main switch MS and the contacts of two reversing line contactors IH and IL. The motor shaft SH is connected through a gear box G with the hoist drum D. The gear box G is provided with a limit switch LS whose contact is normally open and is closed only when a travelling nut I reaches a limit position in dependence upon the amount of cable paid out by the hoist drum D. A frictional brake B for retarding or stopping the hoist drive is usually set for operation under the bias of a spring and has a control coil 2 which releases the brake when energized. A pilot generator PG has its armature 2 connected with the motor shaft SH so as to generate a voltage whose magnitude is proportional to the motor speed and hence to the hoisting or lowering speed of the drive. The field winding 4 of the pilot generator PG is supplied with constant excitation during the operation of the generator.

The output terminals of the pilot generator PG are connected with the direct current control windings of two saturable reactors 5 and 6 whose alternating current reactance windings form part of a control circuit CB of the Wheatstone bridge type. The impedance of the two reactors 5 and 6 in circuit CB is balanced. Two further impedances of constant impedance value are arranged in the remaining branches of the bridge. The input terminals of the bridge circuit are connected between points N and O of the line so that the bridge is energized by alternating current. A rectifier unit R1 is connected across the diagonal of the bridge CB and serves to energize the control winding 8 of the saturable reactor SR. When the reactors 5 and 6 are unsaturated, that is, when the hoist motor is at rest and the output voltage of the pilot generator PG zero, the bridge CB is balanced so that no difference in potential appears at the alternating current terminals of the rectifier unit R1. Hence in this operating condition the control coil 8 is not energized and the reactor SR unsaturated in order to place maximum impedance between motor terminal T1 and line terminal L1. When the hoist motor is in operation the pilot generator current premagnetizes the reactors 5 and 6 to a degree depending upon the motor speed. As a result, the bridge CB becomes increasingly unbalanced at increasing motor speeds. This, in turn, has the effect of imposing a greatly increasing excitation on control coil 8 of reactor SR, thus reducing the impedance between terminals T1 and L1 accordingly.

The essential purpose of the pilot generator control bridge combination just described is to magnetize and saturate the reactor SR so as to increase the impedance of SR at low motor speeds. Hence it will be understood that any other suitable speed-responsive voltage or current control device can be used instead of the illustrated generator-bridge arrangement. For instance, the pilot generator PG may be directly connected with coil 8, under omission of bridge CB. This modification is, in fact, preferable for smaller hoist or elevator drives, while I prefer using the illustrated embodiment of this feature for larger hoisting equipment because it permits using a smaller pilot generator by virtue of the fact that the resultant direct current output of bridge CB supplied to control coil 8 is greatly in excess of the direct current energy generated by the pilot generator PG and hence involves a desirable amplification method.

A master controller MC of the customary drum type is provided for setting the drive in accordance with the desired hoisting and lowering operation. The master controller as shown has an "off" position, five hoisting, and five lowering positions. Its contact drum is provided with a number of segments such as the one denoted by 17 which cooperate with contact fingers such as the one denoted by 18. A number of relays and other auxiliary devices are interposed between the master controller and the power circuit of the drive. These auxiliary devices comprise two transformers TR1 and TR2, each having its secondary connected with a rectifier unit R2 and R3, respectively. The unit R2 serves to provide constant direct current energization for the field winding 4 of the pilot generator PG and the coil 2 of the brake B, under control by relays described hereinafter. The rectifier unit R3 provides direct current energization for a group of timing relays also mentioned in a later place.

The two line contactors 1H and 1L serve to connect the line terminals L1, L2 and L3 to the motor terminals for hoisting and lowering operation, respectively. Contactor 1H has a control coil 10 for actuating three line contacts 11, 12 and 13 and three auxiliary contacts 14, 15 and 16. Contactor 1L has a coil 20, three line contacts 21, 22 and 23, and four auxiliary contacts 24, 25, 26 and 27. The contactor 1H is also closed when a retarding torque is required for deceleration in the lowering direction. The master controller provides for the actuation of contactor 1H on points 1 through 5 hoist, and 1 through 4 lower. Contactor 1L is closed only in the 5th position lower of the master controller in order to cause the motor to run down at synchronous speed.

A relay 2L having a coil 28 and a contact 29 is closed only at the 4th point lower of the master controller and performs the above-mentioned function of the control contact denoted by CC in Fig. 1, although Fig. 6 shows the contact in the secondary circuit of transformer TR.

Another control relay related to the function of the above described voltage unbalancing control means is denoted by CR. It has a control coil 30 for actuating three contacts 31, 32 and 33.

A low voltage relay 1CR, having a coil 7 and a contact 8, must be closed in order to render the entire control system operative. This relay is energized immediately upon the closure of the main switch MS while the master switch is in the "off" position, and it closes at 9 a self holding circuit which maintains the relay operative when the master controller is moved in either direction from the "off" position. Upon voltage failure, the energization of coil 7 becomes insufficient so that the contact 9 opens and thereby deenergizes the control system. After such an occurrence the relay 1CR can only be reclosed by placing the master controller back into its "off" position.

A relay 2CR has its coil 34 controlled by a push-button PB which forms preferably an auxiliary handle contact of the master controller. The purpose of this relay and push-button is to cause the motor to produce up torque at zero speed in order to bring the load to a stop without heating the brake B. The contact 35 of relay 2CR disconnects the control coils of the pilot reactors 5 and 6 from the pilot generator PG and connects them to the rectifier unit R2, i. e. to a source of constant energy. Actuation of the auxiliary contact PB in conjunction with the selection of the proper master controller point results in a very accurate spotting or inching of loads. I have found that increments of movement down to one quarter of a revolution of the motor can readily be obtained in this manner.

Another control relay, denoted by 3CR and having a coil 36 which actuates three contacts 37, 38 and 39, has the purpose to maintain a retarding torque of a time after the master controller has been returned to the "off" position from a retarding position. This prevents a momentary speeding up of the motor from overhauling which may otherwise occur after the power is shut off from the motor and before the magnetic brake B has set. Also when the controller is placed on "off" while lowering at high speed, the motor under control of relay 3CR decelerates the load considerably and thus relieves the magnetic brake of this duty. The necessary timing of the operation of relay 3CR is secured by a timing relay BT with a control coil 43 and a contact 44.

A brake relay BR with a control coil 40 and two contacts 41 and 42 are energized on all hoist and lowering points of the master controller in order to release the brake B. The energizing circuit of relay coil 40 is interlocked, at contacts 15 and 25, with the directional line contactors 1H and 1L so that the brake B cannot be released unless the motor M is connected to the line.

The secondary resistance circuit SRC of the motor M is controlled by a group of contactors denoted by 1A, 2A, 3A, 4A and 5A. Contactor 1A has a coil 50 for closing three contacts 51, 52 and 53. The corresponding coils of the contactors 2A through 5A are denoted by 60, 70, 80 and 90, respectively, and the appertaining remaining contacts by 61 and 62, 71 and 72, 81 and 82, 91 and 92, respectively. Contactors 3A and 4A have interlock contacts denoted by 73, 74 and 83 respectively.

The contactors 1A, 2A and 3A are actuated under direct control by the master controller without timing relays when operating the motor in the hoisting direction. This permits building up sufficient torque instantly to prevent a heavy load from first setting at the beginning of a hoisting performance. The accelerating contactors 4A and 5A are governed by the closure of timing relays 4T and 5T. These timing relays 4T and 5T have neutralizing windings marked 86 and 96, respectively which when energized are connected through a resistor 97 with the rectifier unit R3, and when so connected shorten the timing period of the respective relay. The auxiliary coils 86 and 96 are disconnected from rectifier unit R3 on all hoisting positions of the master controller so that the interval between the closing 3A and 4A or 4A and 5A is relatively long, for instance in the order of ¾ second. In all lowering positions of the master controller the coils 86 and 96 are energized so that the period between the closing of 4A and 5A is shorter, for instance in the order of ¼ to ½ second. The purpose of this difference in timing is to prevent the load from overrunning the control sequence during acceleration in the lowering direction.

The operation of the system according to Fig. 6 as a whole and the cooperation of the above described auxiliary device will be more fully understood from the following step by step description of a complete hoisting and lowering performance in conjunction with the speed torque characteristics shown in Fig. 5 and the sequence chart according to Fig. 7.

With the master controller MC in the illustrated "off" position, the closure of the main switch MS has the effect of energizing transformer TR1, rectifier unit R2 and bridge circuit CB. Coil 7 of relay 1CR is also energized and closes contact 9, and this contact remains closed during all subsequent control operations as long as no voltage failure occurs. Contact 9 connects transformer TR2 to the line so that rectifier unit R3 is also energized, thereby exciting the coils 84 and 94 of timing relays 4T and 5T. Consequently, the relay contacts 85 and 95 are opened. Contactors 1H and 1L and the brake relay BR remain deenergized so that the motor remains at rest and the friction brake B set for operation.

*Hoisting operation*

Point 1: When turning the master controller MC from "off" to first point hoist, the coil 10 of line contactor 1H becomes energized in circuit O, LS, 103, 24, 10, MC, 102, 9, N and closes contacts 11, 12, 13, thereby connecting motor M to the line for operation in the hoisting direction. The interlock contact 14 of contactor 1H prevents coil 20 of contactor 1L from being energized as long as contactor 1H is active. Coil 30 of relay CR is energized through O, 101, 30, MC, 102, 9, N and shorts reactor SR at contact 31. Hence the saturable reactor is ineffective, and it remains ineffective during all subsequent hoisting stages. Contact 15 of line contactor 1H connects coil 40 of relay BR to the line through O, LS, 103, 15, 40, MC, 102, 9, N and releases brake B. Contactors 1A through 5A remain deenergized so that the secondary motor circuit SRC has maximum resistance for starting the motor. As a result the motor operates with a balanced three-phase voltage for lowest hoisting torques as represented by the speed torque characteristics H1 in Fig. 5.

Point 2: The only change occurring in the control system when the master controller MC is advanced from point 1 to second point hoist is that coil 60 of contactor 2A picks up through O, 101, 60, MC, 102, 9, N, and closes contacts 61 and 62, thereby reducing the resistance of circuit SRC for increased acceleration according to the speed torque characteristic H2 in Fig. 5.

Point 3: When advancing the master controller to point 3 hoist, all previous connections are maintained and, in addition, coil 50 of contactor 1A is energized in circuit O, 101, 50, MC and closes contacts 51, 52, 53, thereby further reducing the resistance of circuit SRC for acceleration according to curve H3 in Fig. 5.

Point 4: In addition to the previous connections, coil 70 of contactor 3A comes in through MC and closes contacts 71, 72 for a further reduction of the resistance in circuit SRC. Contact 73 opens the circuit of coil 84 so that the timing relay 4T drops off after elapse of its timing period, thereby closing its contact 85 in preparation of an energizing circuit for coil 80 of contactor 4A. The speed-torque characteristic prevailing at this control stage is exemplified by curve H4 in Fig. 5.

Point 5: At point 5 hoist of the master controller MC coil 80 of contactor 4A is energized through O, 101, 80, 85, MC and reduces the resistance of SRC by closing contacts 81 and 82. Contact 83 of contactor 4A disconnects coil 94 of timing relay 5T so that, after the elapse of the timing period, contact 95 is closed and energizes coil 90 of contactor 5A. Contacts 91 and 92 of this contactor short circuit the remaining resistance in the rotor circuit SRC for maximum acceleration according to a speed torque characteristic as exemplified by curve H5 in Fig. 5.

*Lowering operation*

Point 1: When moving the master controller MC from its "off" position to point 1 lower, line contactor 1H and brake relay BR come in as at first point hoist. However, the coil 30 of relay CR remains deenergized so that contact 31 is kept open. Consequently, the saturable reactor SR is now effective between terminals L1 and T1. In the same control stage, coil 60 of contactor 2A, coil 70 of contactor 3A and coil 80 of contactor 4A are energized through MC so that the three corresponding resistance sections of circuit SRC are shorted immediately. Upon elapse of the timing period of relay 5T, contactor 5A is energized in circuit O, 101, 90, 95, 104, MC. Hence, only one of the resistance sections of SRC remains effective after the starting of the motor. At the beginning of this operation with the motors still at rest, no voltage is produced by the pilot generator PG. Hence the bridge circuit CB is at first balanced and the control coil 8 of the saturable reactor SR deenergized. That is, the reactor SR has initially maximum impedance. Since contact 29 of relay 2L remains open, transformer TR is ineffective similar to the condition existing in the system according to Fig. 1 when its contact CC is open. Consequently, the voltage conditions prevailing in the control system according to Fig. 6 at point 1 lower are similar to those represented by the vector diagram of Fig. 3. That is, the primary voltage of motor M is unbalanced to such a degree as to produce virtually single phase energization, the motor torque being zero. As the motor, under its load, comes up to speed in the lowering direction, the increasing voltage of pilot generator PG causes the control coil 8 to produce an increasing magnetization of the saturable reactor SR. As a result the voltage conditions change towards those represented by the vector diagram of Fig. 4. The motor obtains an unbalanced three-phase energization and produces torque as typified by curve C1 of Fig. 5 having vanishing torque at zero speed.

Point 2: Contactor 4A drops off due to the disconnection of lead 104 at MC. The resistance of circuit SRC is accordingly increased. Relay 5T becomes energized through contact 83 and disconnects coil 90 of contactor 5A so that the resistance of circuit SRC is subsequently further increased. The reactor SR and its automatic control by the pilot generator remain effective as at point 1 lower. The speed torque characteristic obtained in this stage of operation is exemplified by curve C2 in Fig. 5.

Point 3: The only change occurring at point 3 lower, over the conditions at point 2, is the disconnection of coil 70 at MC causing the contactor 3A to drop off. As a result, the resistance of circuit SRC is further increased to obtain a speed torque characteristic similar to curve C3 in Fig. 5.

Point 4: When passing to point 4 lower of the master controller, coil 60 of contactor 2A is disconnected at MC bringing circuit SRC up to maximum resistance. Coil 28 of relay 2L is energized through MC and closes contact 29, thereby connecting the secondary S of transformer TR in parallel to the saturable reactor SR, thus establishing a circuit like that of Fig. 1 (with contactor CC in Fig. 1 closed). The system is now set for low-speed light-hook lowering under unbalance voltage conditions. The resulting speed torque characteristic is represented by curve L4 in Fig. 5. At higher lowering speeds the pilot generator causes the reactor SR to be premagnetized to a degree depending upon the motor speed, thereby varying the inductive resistance SR accordingly. At the same time, the transformer secondary S imposes an overvoltage on the reactor according to vector EX in Fig. 2 so that down torque is produced in opposition to the normal direction of torque set by the closure of contactor IH. At diminishing motor speeds the reactance of SR increases, thereby reducing the magnitude of voltage EX until, at a given speed value of say 5%, depending upon the selected rating of the control network, the torque becomes zero (point Z in Fig. 5) in accordance with the vector diagram of Fig. 3. At still lower speeds the torque is negative (countertorque) and remains negative down to zero speed. This provides a means of driving a light hook (no load) down at low speed and affords an accurate light-hook inching.

Point 5: At point 5 lower of the master controller, point 10 of contactor IH is disconnected at MC and coil 20 of contactor IL is energized instead, thereby setting the motor for lowering torque. Relay 2L drops off because its coil 28 is disconnected at MC. Coil 30 of relay CR comes in through MC and closes contact 31, thus short circuiting the reactor SR. As a result a balanced three-phase energization is effective for producing torque in the lowering direction. Contactors 2A, IA, 3A, 4A and subsequent contactor 5A pick up and short the circuit SRC entirely for highest lowering speeds.

The illustrated speed torque characteristics in vector diagrams are shown only as typical since the exact speed-torque data depend on the selected ratings of the circuit devices. It will also be understood from the foregoing that the control device may readily be designed for obtaining characteristics of the type represented by curve C4 in Fig. 5 at several points of the master controller.

The feature of automatically transferring from high or 100% unbalance, to low unbalance in response to speed, permits holding the motor current input to a comparatively low value at all times. When schemes involving a fixed voltage unbalance are employed, it is necessary to put up with an excessive energy input in order to obtain satisfactory torques for medium and low speeds. In contrast thereto, the use of a vector according to the invention provides the desired torques by automatically transferring to a low unbalance and hence is characterized by low input and high torque. I have found, for instance, that the maximum input to any primary phase in such a system need not exceed 125% of normal, the input to the other two phases being always lower.

Being aware of the fact that the above described embodiment can be modified in various respects by those skilled in the art without departing from the essential aims, advantages and features of the invention, I wish this specification to be understood as illustrative rather than in a limiting sense.

I claim as my invention:

1. A motor control system comprising an alternating current motor having three-phase field terminals, three-phase current supply means connected to said terminals, an impedance device interposed between one of said terminals and said supply means, a transformer having a primary resistance circuit connected across two of said terminals and a secondary circuit connected across said impedance device for imposing thereon a voltage so as to unbalance the three-phase voltage of said motor in accordance with a motor torque of given direction, and means for controlling the impedance of said device so as to change said torque toward its opposite direction.

2. A motor control system comprising an alternating current motor having three-phase field terminals, three-phase current supply means connected to said terminals, a variable inductance device series-connected in one phase of said current supply means, voltage control means connected across said device for imposing thereon a voltage so as to unbalance the three-phase voltage of said motor to obtain a motor torque in a given direction, and means for controlling the inductive resistance of said device so as to change said torque toward the opposite direction.

3. A motor control system comprising an alternating current motor having three-phase field terminals, three-phase current supply means connected to said terminals, a variable inductance device series connected in one phase of said current supply means, a transformer having a primary resistance circuit connected across two of said terminals and a secondary circuit connected across said device for imposing thereon a voltage drop so as to unbalance the three-phase voltage of said motor to obtain a motor torque in a given direction, and means for controlling the inductive resistance of said device so as to change said torque in the direction toward zero torque.

4. A motor control system comprising an alternating current motor having three-phase field terminals, three-phase current supply means connected to said terminals, a saturable reactor series-connected between one of said terminals and said supply means and having a premagnetizing winding for controlling the reactance of the reactor, a transformer having a primary circuit containing a resistor and connected across two of said terminals and a secondary circuit connected across said reactor, and controllable energizing means connected with said winding for causing it to change said reactance so as to change said torque toward the reverse torque direction.

5. A motor control system comprising an alternating current motor, three-phase current supply means therefor, a saturable reactor disposed in one phase of said means, a resistor, a transformer having a secondary connected across said reactor and a primary connected across two phases of said supply means in series-arrangement with said resistor for unbalancing the motor voltage to obtain a motor torque of given direction, and control means associated with said reactor and controlled by said motor to vary the reactance of said reactor in dependence upon the motor speed so as to change said torque towards its opposite direction at reduced motor speeds.

6. A hoist control system comprising an alternating current hoist motor, three-phase current supply means therefor, a saturable reactor disposed in one phase of said means, a resistor, a transformer having a secondary connected across said reactor and a primary connected across two phases of said supply means in series-arrangement with said resistor for unbalancing the motor voltage to obtain a motor torque of given direction, and means controlled by said motor and associated with said reactor for varying its reactance so as to reverse the direction of said torque at an increased motor speed.

7. A hoist control system comprising an alternating current hoist motor, three-phase current supply means therefor, a saturable reactor disposed in one phase of said means, a resistor, a transformer having a secondary connected across said reactor and a primary connected across two phases of said supply means in series-arrangement with said resistor for unbalancing the motor voltage to obtain a motor torque in the lowering direction, and means controlled by said motor and associated with said reactor for varying its reactance so as to reverse the direction of said torque at an increased lowering speed of said motor.

8. A hoist control system comprising an alternating current hoist motor, three-phase current supply means therefor, selective control means including a master controller for connecting said supply means to said motor for hoisting and lowering operation respectively, a variable inductance device operative in series-connection in one phase of said supply means when said motor is set for lowering operation, voltage control means connected across said device for imposing thereon a voltage drop for unbalancing the three-phase voltage of said motor in accordance with a lowering torque, and means for controlling the inductive resistance of said device so as to reverse the motor torque for countertorque operation.

9. A hoist control system comprising an alternating current hoist motor, three-phase current supply means therefor, selective control means including a master controller for connecting said supply means to said motor for hoisting and lowering operation respectively, a saturable reactor having a reactance winding series-connected in one phase of said supply means when said master controller is set for lowering operation and containing a premagnetizing winding for controlling the reactive resistance of said reactor, a resistor, a transformer having a primary series-connected with said resistor between two phases of said supply means and a secondary connected across said reactance winding for imposing thereon a voltage drop so as to unbalance the three-phase voltage of said motor, and controllable energizing means connected with said premagnetizing winding for changing said reactive resistance in order to reverse the motor torque under over-hauling load conditions.

10. A hoist control system comprising an alternating current hoist motor, three-phase current supply means therefor, selective control means including a master controller for connecting said supply means to said motor for hoisting and lowering operation respectively, a saturable reactor having a reactance winding series-connected in one phase of said supply means when said master controller is set for lowering operation and containing a premagnetizing winding and comprising a pilot generator in mechanical connection with said motor for changing said reactive resistance in order to reverse the motor torque at low lowering speeds.

11. A hoist control system comprising an alternating current hoist motor, three-phase current supply means therefor, a voltage-controlling inductance network disposed between said supply means and said motor for unbalancing the motor voltage so as to obtain three-phase torque in the lowering direction, and control means for adjusting said inductance network in dependence upon the motor speed so as to reverse the voltage unbalance and torque when in operation in order to produce countertorque at low lowering speeds of said motor.

12. A motor control system having an induction motor, current supply means therefor having a multiple number of phases, impedance means disposed in a lesser number of said phases and having a magnitude for unbalancing in one direction the multiple-phase voltage imposed on said motor, a synchronous voltage source connected with said impedance means for producing a voltage drop across said impedance means of a magnitude tending to unbalance said multiphase voltage in the opposite direction, and means for controlling one of said magnitudes so as to obtain a reversal of unbalance direction in order to reverse the torque of said motor.

13. A hoist control system having a multiphase alternating current motor, multiphase current supply means having a balanced input voltage, unbalanced impedance means disposed between said supply means and said motor for unbalancing the motor voltage, a source of synchronous voltage connected with said impedance means for superimposing a voltage drop across said impedance means tending to counteract said voltage unbalance, and means for controlling the ratio of said impedance unbalance and said voltage drop so as to thereby vary the speed torque characteristics of the motor.

14. A hoist control system having a multiphase alternating current motor, multiphase current supply means having a balanced input voltage, inductance means asymmetrically disposed between said supply means and said motor for unbalancing the motor voltage, a source of synchronous voltage connected with said inductance means for superimposing thereon a voltage drop in opposition to said voltage unbalance, and control means for controlling one of said inductance means and voltage source so as to thereby reverse the direction of the voltage unbalance for reversing the torque of said motor.

15. A hoist control system having a multiphase alternating current motor, multiphase current supply means having a balanced input voltage, inductance means asymmetrically disposed between said supply means and said motor for unbalancing the motor voltage, a source of synchronous voltage connected with said inductance means for superimposing thereon a voltage drop in opposition to said voltage unbalance, said voltage source being connected to said supply means to be energized thereby, and speed-responsive means connected with said motor for controlling one of said inductance means and voltage source so as to thereby reverse the direction of the voltage unbalance in response to the motor speed for reversing the motor torque.

16. A motor control system, comprising an alternating current motor having primary terminals, multiphase current supply means connected to said motor, controllable inductive means disposed in one phase of said supply means for unbalancing, when operative, the motor voltage within the phase sequence of the supply voltage of said supply means, controllable circuit means disposed between two phases of said supply means for unbalancing, when operative, said motor voltage so as to reverse the phase sequence of said motor voltage relative to that of said supply voltage, and means for controlling said inductive means and said circuit means in a given relation to the operating conditions of said motor.

17. A motor control system, comprising an alternating current motor having primary terminals, multiphase current supply means connected to said motor, reactor means of controllable saturation disposed in one phase of said supply means for unbalancing, when operative, the motor voltage within the phase sequence of the supply voltage of said supply means, a resistance reactance circuit disposed between two phases of said supply means for unbalancing, when operative, said motor voltage so as to reverse the phase sequence of said motor voltage relative to that of said supply voltage, and means for controlling said reactor means and said circuit in a given reference to the operating condition of said motor.

WILLIAM R. WICKERHAM.